United States Patent [19]

Krueger

[11] Patent Number: 4,530,388
[45] Date of Patent: Jul. 23, 1985

[54] TIRE HANDLING DEVICE

[76] Inventor: Harold L. Krueger, R. R. #1, Barnesville, Minn. 56514

[21] Appl. No.: 509,353

[22] Filed: Jun. 30, 1983

[51] Int. Cl.³ .............................................. B60C 25/08
[52] U.S. Cl. ................................................. 157/1.22
[58] Field of Search .............................. 157/1.22, 1.24

[56] References Cited

U.S. PATENT DOCUMENTS

| | | |
|---|---|---|
| 2,437,512 | 3/1948 | Ekse . |
| 2,470,534 | 5/1949 | Thomas ............................... 157/1.24 |
| 2,482,789 | 9/1949 | Moore ................................. 157/1.24 |
| 2,546,988 | 4/1951 | Eberly ................................. 157/1.24 |
| 2,922,468 | 1/1960 | Fitch ................................... 157/1.22 |
| 3,818,967 | 6/1974 | Dunn ................................... 157/1.22 |

Primary Examiner—James G. Smith
Attorney, Agent, or Firm—Kinney & Lange

[57] ABSTRACT

A tire handling device for mounting or removing a tire on a wheel rim while the wheel is attached to the vehicle in which there is a circular track detachably secured to the rim of the wheel and in which there is a motor which is in driving engagement with the track and upon operation of the motor moves around the track. Means are provided for securing a tire tool to the motor so that as the motor moves around the track, the tire tool is carried with it.

11 Claims, 8 Drawing Figures

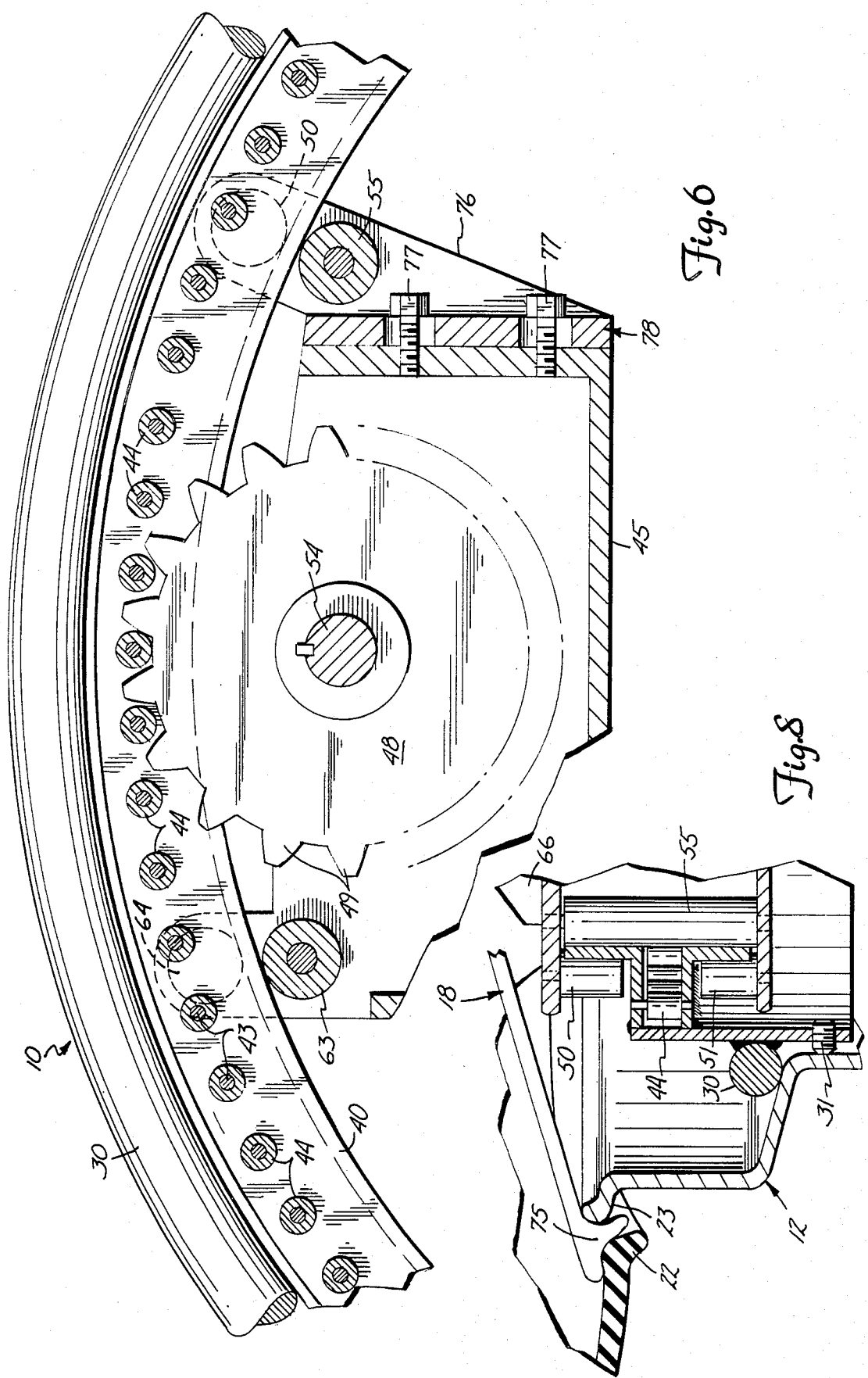

TIRE HANDLING DEVICE

BACKGROUND OF THE INVENTION

1. Field of the Invention

The present invention relates to a tire handling device, and in particular, it relates to a device for mounting and removing tires.

2. Description of the Prior Art

It is very desirable, particularly in the case of large vehicles such as tractors or earthworking machines to be able to remove a tire from a wheel or remount a tire on the wheel without removing the wheel from the vehicle. Many of these wheels are very bulky and heavy and considerable time is lost if the wheel has to be removed or transported to a place where the tire can be changed. One of the reasons why it has been necessary to remove the wheel and tire is that it is almost impossible with large tires to change them using manual tools. Normally, a motor-driven tire changer is not suitable for use in the field or at some location where the equipment is being used.

In many cases, such as the tire changers shown in the Ekse U.S. Pat. No. 2,437,512, the Moore U.S. Pat. No. 2,482,789, and the Eberly U.S. Pat. No. 2,546,988, for example, the wheel and tire are mounted on a rotatable spindle driven by a motor which is housed in a cabinet, the tire and wheel being rotated preferably, in a horizontal plane. Obviously, this type of equipment could not be used with tires still on the wheel.

The Thomas U.S. Pat. No. 2,470,534 does show a tire changing device which can be used without removing the wheel. The equipment here, however, involves a stand which must be moved up to the tire and provision must be made for insertion of a portion of the equipment through a central opening in the wheel. Because of this, it is necessary to provide for vertical adjustment of the tire engaging apparatus since it must rotate about a central point. The result is that it is necessary to employ a very bulky arrangement which is not very suitable for use in a plowed field or in various locations in which earthworking machinery is employed.

SUMMARY OF THE INVENTION

The present invention involves a portable unit which can be readily secured to a vehicle wheel regardless of the location of the equipment on which the wheel is mounted. Basically, it involves the use of a motor-driven unit which is coupled to a circular track which can be quickly secured to the rim of the wheel on which the tire is mounted. The motor, upon being energized, travels around the circular track. It has means for securing a tire tool to it and moving the tire tool with the motor so that as a motor travels around, the tire tool is progressively moved around, either removing the tire or mounting it depending upon the situation.

The motor drives a gear which is coupled to tooth engaging elements disposed about the circular track. It is retained in position on the track by rollers which cooperate with circular flanges projecting out from the track and which are engaged by the rollers.

Because of the fact that the tire handling apparatus is entirely secured to the wheel and does not rely upon support from the ground, it can be used regardless of where the equipment is located. Furthermore, since it does not require a bulky stand, it can be readily transported to the site of the vehicle.

Various other features and objects of the invention will be apparent from the accompanying specification, claims and drawings.

BRIEF DESCRIPTION OF THE DRAWINGS

FIG. 6 is a fragmentary view, partly in section, on a larger scale, showing the manner in which the teeth of the motor drive gear engage the tooth engaging elements of the circular track.

FIG. 8 is a fragmentary sectional view similar to FIG. 7 but showing the tire tool being used to mount a tire.

DETAILED DESCRIPTION OF THE PREFERRED EMBODIMENTS

Figure 1:
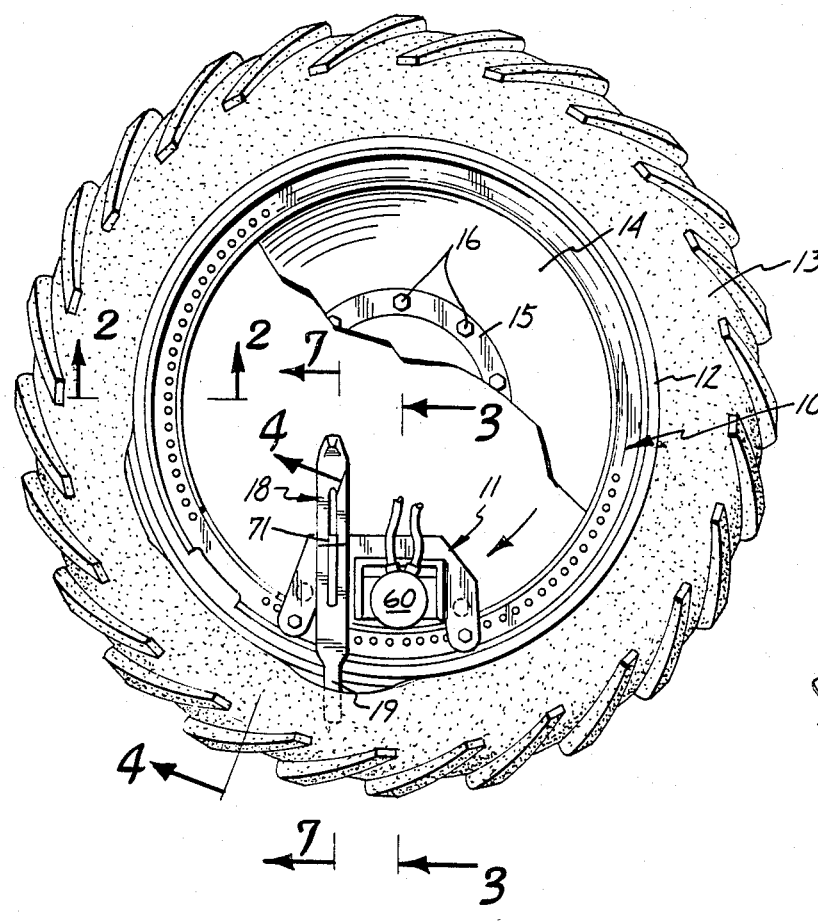
FIG. 1 is a front elevational view of the improved tire handling device shown in position on a wheel and in the process of removing a tire from the wheel.

Referring to the drawings, and more specifically to FIG. 1, the device of the present invention is illustrated in connection with an automobile wheel and rim and is shown in the process of removing a tire. The numeral 10 is used to indicate the circular track and the numeral 11 to indicate the motor assembly which is supported by this circular track. The circular track 10 is secured to a rim 12 upon which a tire 13 is mounted. The rim 12 forms part of a wheel structure 14 which has a flange 15 secured by bolts 16 to the axle hub. Secured to the motor 11 is a tire tool 18 which, as will be explained, is driven by the motor 11 to remove the tire from the rim 12. The tire tool 18 is shown as having a narrow elongated portion 19 which is shown as extending between the rim and the beads of the tire 13. It will be obvious that as motor 11 travels in a clockwise direction around the rim 12, the member portion 19 of the tire tool 18 is effective to separate the tire from the rim. This is illustrated in more detail in FIG. 7 and will be described in more detail in connection with that figure.

Figure 2:
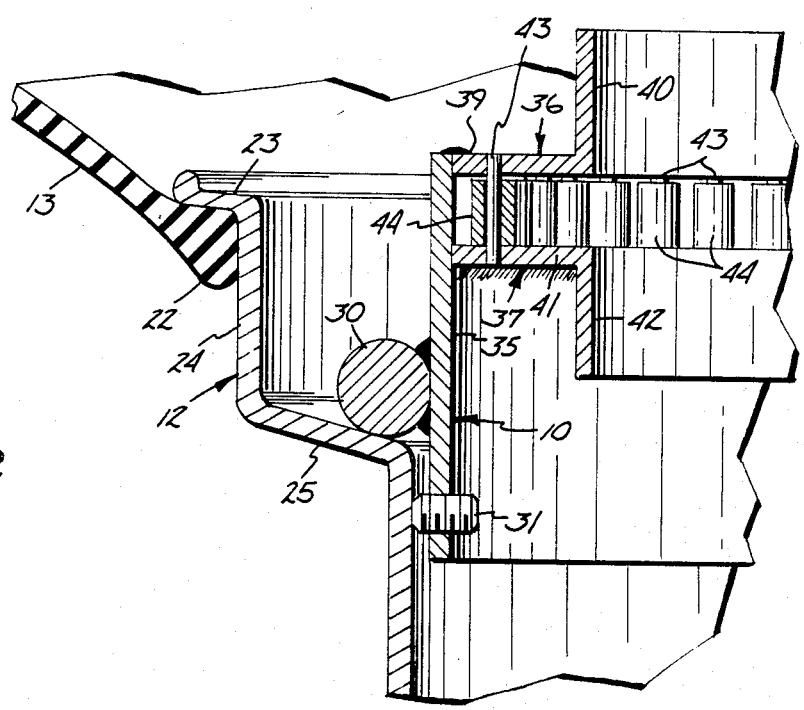
FIG. 2 is a fragmentary sectional view, the section being taken along the line 2—2 of FIG. 1.

Referring to FIG. 2, the edge of the tire 13 is shown as having a bead 22. This bead is normally disposed within an outermost flange 23 of the rim 12, as shown in FIG. 2. The outermost flange 23 connects to a cylindrical portion 24 of the rim which in turn is connected to an inwardly extending sloping conical portion 25.

Figure 7:
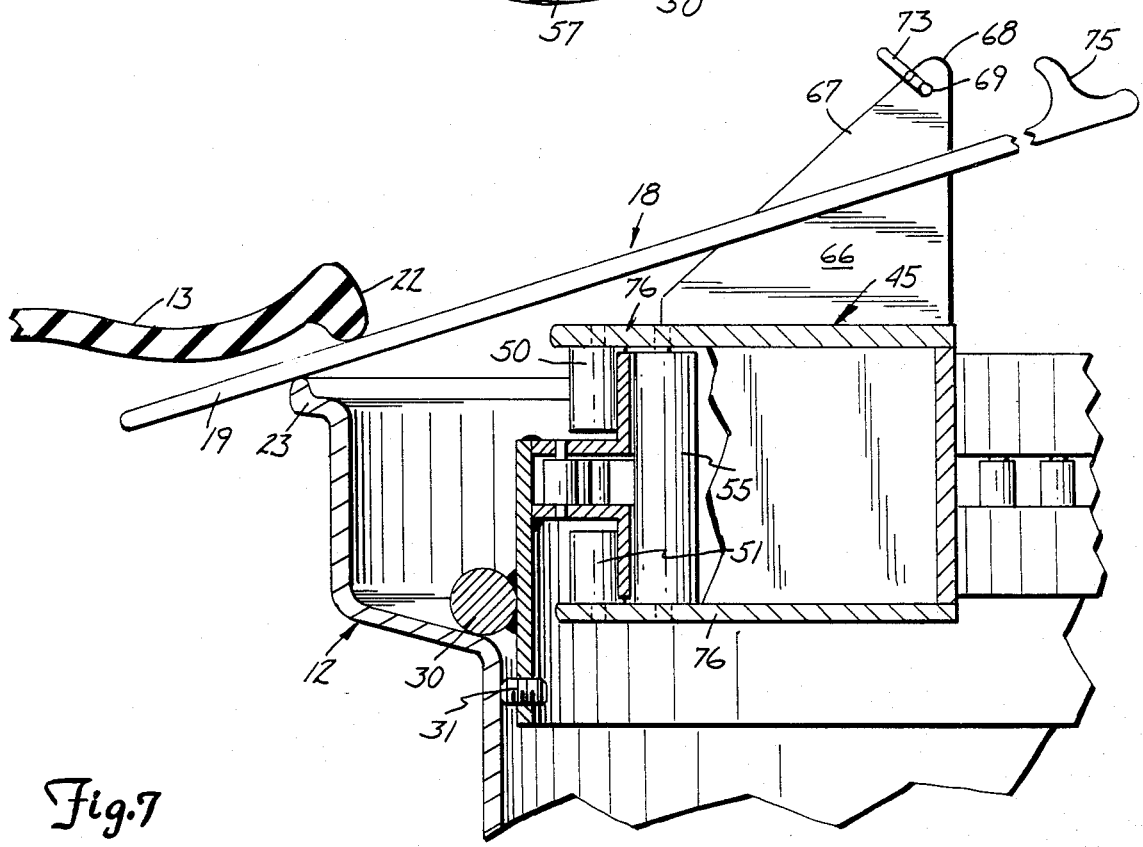
FIG. 7 is a sectional view showing the motor portion of the circular track and the rim in section and showing the tire tool being used to demount a tire, the section being taken along the line 7—7 of FIG. 1.

The circular track 10 has a circular rod 30 secured thereto in any suitable manner as by welding. The circular rod 30 abuts against the inclined conical portion 25 of the rim to limit the inward movement of the circular track 10. The circular track 10 is held in engagement with the rim by a plurality of set screws 31 spaced uniformly about the periphery of the circular track 10. The set screw 31 shown in FIG. 2 is different, for example, than the set screw shown in FIG. 7 since the sectional views of FIGS. 2 and 7 are taken along different planes. It is to be understood that there are further set screws 31 spaced uniformly about the periphery of the circular track 10.

Figure 3:
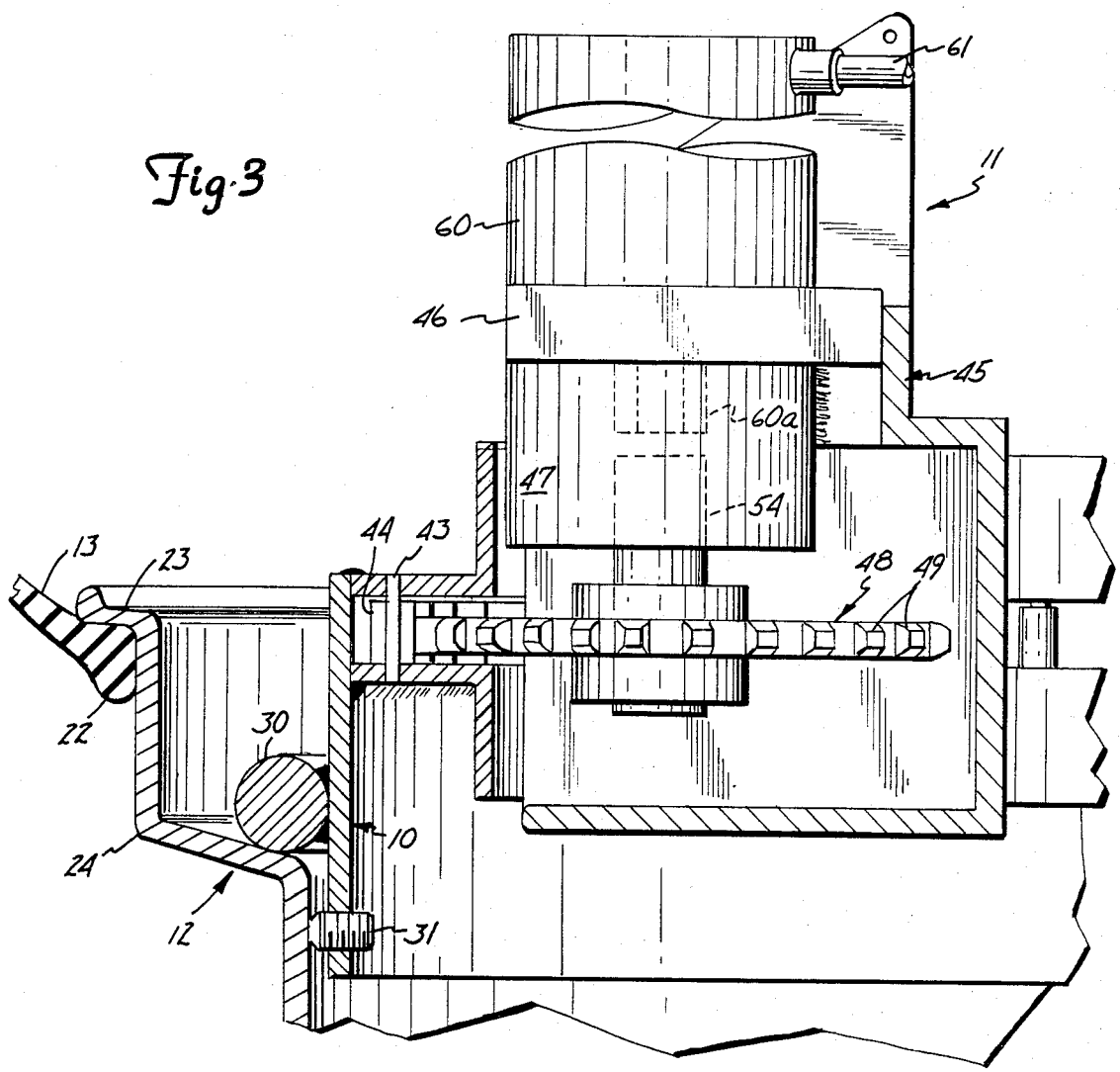
FIG. 3 is a sectional view through the motor unit, a portion of the circular track and a portion of the rim, the section being taken along the line 3—3 of FIG. 1.

Secured to a cylindrical portion 35 of the circular track 10 are a plurality of annular brackets 36 and 37, each of which are L-shaped in cross section over most of their extent. The annular bracket 36 has two legs 39 and 40, leg 39 forming an annulus which is securely fastened to the cylindrical portion 35 as by welding. The leg 40 is cylindrical and extends parallel to the axis of the rim and is cut away over a short portion as will be explained. Similarly, annular bracket 41 has a leg in the form of an annulus 41 rigidly secured to the cylindrical member 35 and extending at right angles to the axis of the rim. The bracket 41 also has a cylindrical portion 42 which, like portion 41, extends parallel to the axis of the wheel, and is cut away over a portion of its length. Extending between the annular legs 39 and 41 and secured thereto are a plurality of pins 43. Supported on each pin 43 is a roller 44. The rollers 44, as will be explained, constitute tooth-engaging elements. The disposition of rollers 44 around the periphery of the circular track 10 is best shown in FIG. 6, in which a portion of the track is shown. Referring now to FIG. 3, a portion of the motor assembly 11 is shown. The motor assembly is located within a housing 45. The motor proper is designated by the numeral 60 and is supported by a bracket 46 which is non-rotatably supported in housing 45. The shaft 60a of motor 40 is detachably coupled by means not shown to a shaft 54 within a bearing 47. The motor 60 and shaft 60a can be withdrawn from the bracket 46 and bearing 47. The shaft 54 supports and drives a large spur gear 48 having a plurality of uniformly spaced gear teeth 49. The gear teeth 49 are designed to cooperate with the rollers 44. As will be presently explained, the motor 11 and the housing 45 are secured to the circular track 10 in such a manner as to rotate along the track. Since the circular track 10 is fastened to the rim 12 and is prevented from circumferential movement with respect to the rim 12 by reason of the set screws 31, it will be obvious that rotation of the gear 48 causes the motor housing to move with respect to the circular track 10.

Figure 4:
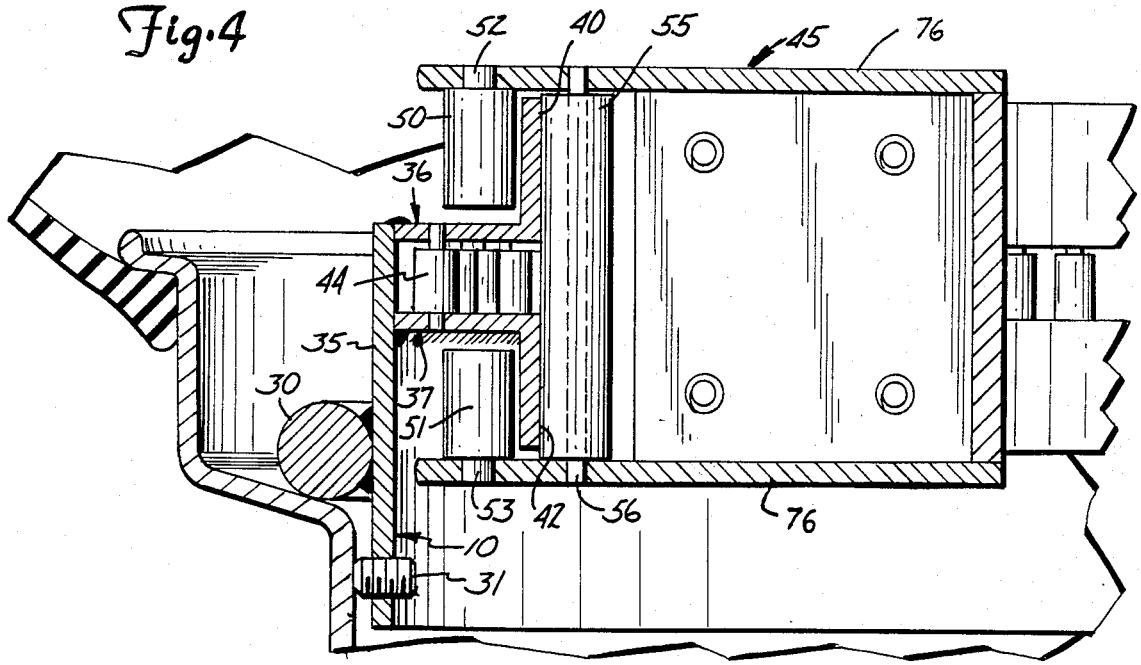
FIG. 4 is a sectional view through a portion of the motor, a different portion of the circular track and a portion of the rim, the section being taken along the line 4—4 of FIG. 1.
Figure 5:
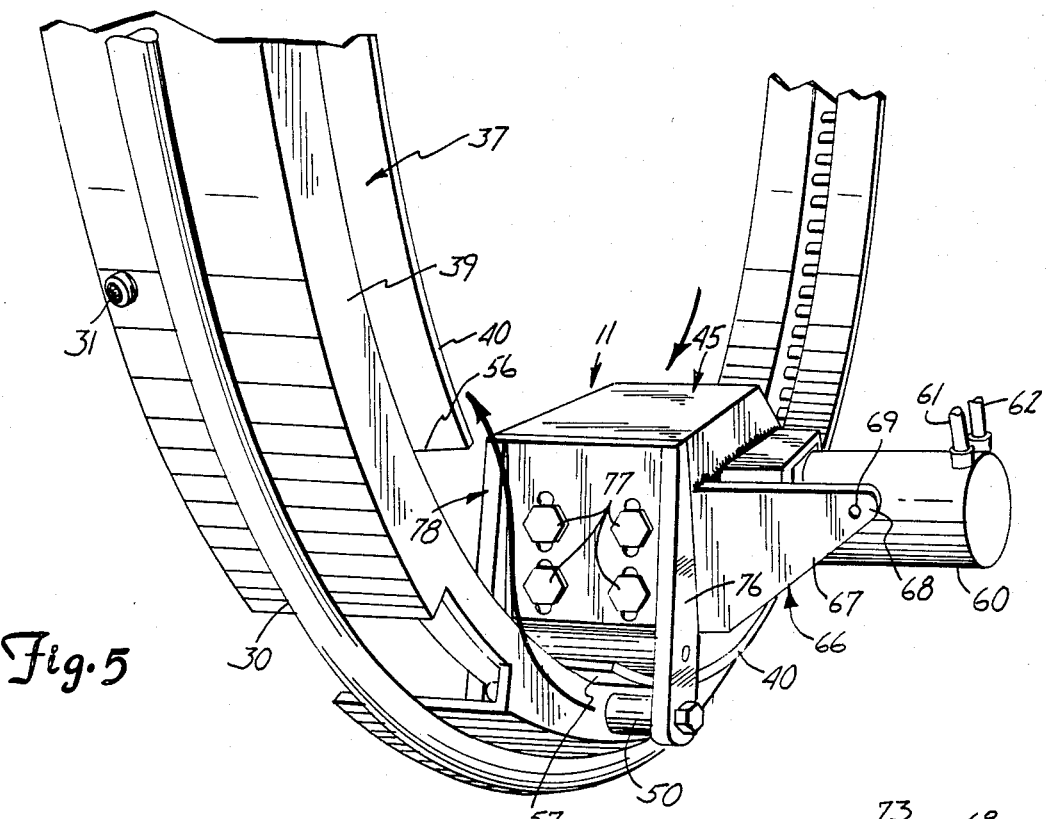
FIG. 5 is a perspective view of the tire changer of the present invention.

Referring now to FIGS. 4 and 5, a plurality of rollers 50 and 51 are supported by stub shafts 52 and 53, respectively, which stub shafts 52 are fastened to the arms 76 of a plate 78 adjustably secured to the motor housing 45. The arms 76, one on each edge of plate 78, extend downwardly and support the rollers 50 and 51 so that they extend inwardly. The rollers 50 and 51 are designed to engage the outer sides of the cylindrical legs 40 and 42 of brackets 36 and 37 which, as previously explained, are secured to the cylindrical portion 35 of the circular track 10. A roller 55 extends across between the two opposed legs 76 of plate 78, being journalled on a shaft 56 which is secured to the opposite legs 76. The roller 45 bears upon the inner wall of circular flanges 40 and 42. It will thus be seen that the plate 78 of motor housing 45 is rotatably secured to the brackets 36 and 37 which in turn are fastened to and form part of the circular track 10. The motor housing 45 is thus mounted for circular movement around the circular track 10.

In order to enable the rollers 50 and 51 to be placed on the outside of flanges 4 and 42, a portion of these flanges are cut away as shown in connection with flange 40 in FIG. 5. It will be noticed that flange 40 is cut away between points 56 and 57 to enable the insertion of the roller 50 outside of the flange 40. The flange 41 (not shown in FIG. 5) is similarly cut away.

Provision is made for adjusting the position of rollers 50, 51 and 55 with respect to the motor housing 45. As best shown in FIGS. 5 and 6, the plate 78 from which arms 76 project is adjustable with respect to the motor housing 45. A plurality of cap screws 77 extend through slots in the plate 78. By loosening the cap screws 77, the plate 78 can be adjusted vertically with respect to the motor housing 45. The purpose of this adjustment is to enable the spur gear 48 to be adjusted with respect to the rollers 44 so that the teeth 49 of the spur gear mesh properly with the rollers 44. After the proper adjustment has been obtained, the cap screws 77 are again tightened to maintain the desired engagement between the teeth 49 or spur gear 48 and the rollers 44.

Referring particularly to FIG. 5, the motor 60 is shown as a hydraulic motor with hydraulic leads 61 and 62 connected to the motor. It is of course possible to use an electric motor. In such a case, a suitable gear train would have to be provided.

The housing 45 of the motor is retained on the circular track not only by the rollers 50, 51 and 55, considered in connection with 54, but also by a similar set of rollers on the other side of the housing 45. Two of these are shown in FIG. 6. Roller 63 corresponds to roller 55, previously discussed, and roller 64 corresponds to roller 50. It will be understood that there will be another corresponding roller 64 mounted on a stub shaft in the same way and engaging flange 42. The roller 64 is shown as engaging flange 40. As with rollers 50 and 51, it is necessary to insert roller 64 and its counterpart in the openings in flanges 40 and 42, discussed in connection with FIG. 5. The roller is then moved to a position in which the rollers 50, 51, 64 and its counterpart are in engagement with uninterrupted portions of the circular flanges 40 and 42. The rollers 63, 64 and the roller 64 not shown, are supported directly from the motor housing and not from an adjustable plate as with rollers 50, 51 and 55. The reason for this is that the only purpose of the adjustability is to adjust the position of the teeth of spur gear 48 with respect to the rollers 44 on the circular track. By making the adjustment on one side of the housing, it is possible to get the desired relationship between the teeth of the spur gear 48 and the rollers. By having an adjustment on only one side, it makes the problem of adjustment much simpler and also reduces the cost of the apparatus.

It will be appreciated from the foregoing that whenever the motor 60 is energized through the supply of hydraulic fluid thereto, the spur gear 48 will be rotated to move along the circular track and successively engage the rollers 40. The rollers 40 are spaced apart to mesh with the teeth 49 of the spur gear. Furthermore, by adjusting the plate 78 to shift the position of the motor housing with respect to the circular track it is possible to get the desired engagement between the teeth 49 of the spur gear and the rollers. Since, as previously explained, the circular track is fixed with respect to the rim, the rotation of the spur gear 48 will cause the motor assembly 11 to move along the circular track. As shown in FIG. 5, the motor will move in a clockwise direction.

Projecting from the motor housing 45 is a flange 66, as best shown in FIGS. 5 and 7. The flange 66 is of rectangular cross section. It has a sloping outer wall 67 with a relatively narrow upper corner portion 68. The flange 66 is provided with an opening 69 for purposes to be presently described. The purpose of the flange 66 is to support and move with it the tire tool 18 briefly discussed in connection with FIG. 1. As pointed out in FIG. 1, and as shown therein, the tire tool is provided with a slot 71 which fits over the projecting flange 66. Because of the relatively narrow end portion 68 and the inclined wall 67, it is relatively easy to fit the slot over the flange 66.

In use, the tire tool is inserted between the bead 22 and the outer lip 23 of a rim 12 to pry the bead 22 of the tire 13 away from the rim. The tire tool 18 is then forced inwardly between the bead 22 and the outer portion of flange 23 of the rim 12 to the position shown in FIG. 7. The tire tool 18 can now be tipped so that the slot of the tire tool extends over the flange 67 of the motor housing 45. Since the slot in the tire tool is only slightly larger than the thickness of the flange 66, the tire tool is firmly held against lateral movement with respect to the flange 66. In order to insure that the tire tool 18 does not slip off of the flange 66, a retainer 73 can be inserted through the opening 69 to prevent outward movement of the tire tool after it has been engaged over the flange 66. It will be obvious that when the tire tool 18 is anchored to the motor assembly 11 by reason of the tire tool extending over the flange 67, the tire tool will be moved along with the motor 11 as it rotates around the circular track. The bead 22 is thus progressively disengaged from the rim 12. This is done with no effort on the part of the operator beyond the initial effort of putting the motor in position on the rim and initially inserting the tire tool between the bead and the rim 23. The whole operation is performed while a rim 12 is in position on the vehicle so that it is unnecessary to remove the wheel from the vehicle in order to change the tire. It is to be understood, of course, that after the bead on one side of the tire has been removed, the same apparatus can be used for removing the bead on the other side of the tire.

Not only is the equipment suitable for removing a tire, but it is also suitable for mounting a tire. The operation for mounting a tire is shown in connection with FIG. 8. Referring to FIG. 8, it will be noted that the tire tool 18 has at the opposite end from the narrow end 19, a hook end 75. In mounting a tire, the hook end 75 is inserted between the bead 22 and the outer flange of the rim 12 and the bead 22 is manipulated so that it overlies the outer flange 23. The slot 71 is then placed over the flange 66 and locked in position. As the motor travels around, the bead 22 is progressively moved into a position where it is on the inner side of the outer flange 23 of the rim 12. As the tire tool moves along, the bead 22 contracts so as to be seated on the rim 12.

CONCLUSION

It will be seen that I have provided a very simple apparatus for removing or mounting a tire which is usable at the location of the vehicle without removal of the wheel. The apparatus can be readily transported since it does not require a separate stand for mounting it. The equipment is directly mounted on the wheel.

While I have shown a specific form of the invention for purposes of illustration, it is to be understood that the scope of the invention is limited solely by that of the appended claims.

What is claimed:

1. In a tire handling device for mounting or removing a tire on a wheel rim while the wheel is attached to the vehicle, the device comprising:
    a circular track insertable into a rim from the exterior thereof and provided with means accessible from the exterior of the rim for detachably securing the track to the rim and holding the same against circumferential movement with respect to the rim;
    a motor having a rotatable element driven by the motor;
    means for supporting the motor on the track with the rotatable element drivably coupled to the track so that upon operation of the motor, the motor travels around the rim;
    roller means secured to said motor supporting means and engaging said track at spaced points to guide the motor supporting means as the motor travels around the rim; and
    means secured to the motor supporting means for driving a tire tool around the rim as the motor moves around the rim.
2. The tire handling device of claim 1 in which the rotatable element of the motor is a gear and in which the track has a plurality of tooth engaging elements so spaced as to be in engagement with the teeth of the gear as the latter is rotated.
3. The tire handling device of claim 1 in which a circular ring is secured to the outer wall of the circular track to abut a side wall of the wheel rim to position the circular track with respect to the rim in an axial direction.
4. The tire handling device of claim 1 in which a plurality of set screws extend through the circular track in threaded engagement therewith, said screws being adapted to engage the rim upon tightening of the set screws to retain the circular track in engagement with the rim.
5. The tire handling device of claim 1 in which the motor supporting means has a stud projecting therefrom, the stud being positioned to engage a tire tool to drive the same around the rim.
6. The tire handling device of claim 5 in which the the tire tool can be engaged with the stud regardless of whether the tire tool is being used to mount or remove a tire.
7. The tire handling device of claim 1 in which the circular track has a circular flange forming a circular track portion extending therefrom and in which the motor has a portion in rolling engagement with the circular track portion to retain the motor in position on the track.
8. The tire handling device of claim 7 in which the circular track has two such circular track portions spaced from each other and in which the motor has two rollers, one engaging each of the circular track portions to retain the motor in position on the track.
9. The tire handling device of claim 7 in which the motor has opposed rollers engaging opposite sides of the circular track portions.
10. The tire handling device of claim 8 in which the motor has two spaced pairs of rollers, one roller each of one pair engaging one of the circular track portions and one roller each of the other pair engaging the other of the circular track portions.
11. The tire handling device of claim 2 in which there is means for adjusting the lateral distance between the axis of said gear and the tooth engaging elements to adjust the engagement of the gear with the tooth engagement elements.

* * * * *